(12) United States Patent
Sunaoshi et al.

(10) Patent No.: US 10,989,352 B2
(45) Date of Patent: Apr. 27, 2021

(54) DISPLAY APPARATUS

(71) Applicant: Sony Corporation, Tokyo (JP)

(72) Inventors: Shigenori Sunaoshi, Kanagawa (JP);
Shinpei Kondo, Kanagawa (JP);
Shigeya Kuwao, Kanagawa (JP);
Hiroaki Yokota, Tokyo (JP); Hirotaka Tako, Kanagawa (JP)

(73) Assignee: Sony Corporation

( * ) Notice: Subject to any disclaimer, the term of this patent is extended or adjusted under 35 U.S.C. 154(b) by 0 days.

(21) Appl. No.: 16/338,772

(22) PCT Filed: Nov. 9, 2017

(86) PCT No.: PCT/JP2017/040402
§ 371 (c)(1),
(2) Date: Apr. 2, 2019

(87) PCT Pub. No.: WO2018/123288
PCT Pub. Date: Jul. 5, 2018

(65) Prior Publication Data
US 2020/0224818 A1    Jul. 16, 2020

(30) Foreign Application Priority Data

Dec. 27, 2016  (JP) .............................. JP2016-253587

(51) Int. Cl.
*H05K 7/02*    (2006.01)
*H05K 7/04*    (2006.01)
(Continued)

(52) U.S. Cl.
CPC ............ *F16M 11/10* (2013.01); *F16M 11/22* (2013.01); *G09F 9/00* (2013.01); *H04N 5/655* (2013.01); *F16M 2200/08* (2013.01)

(58) Field of Classification Search
USPC ........................................................ 361/810
See application file for complete search history.

(56) References Cited

U.S. PATENT DOCUMENTS 6,570,627 B1 * 5/2003 Chang .................... F16M 11/10
                                                   248/917
7,280,665 B2 * 10/2007 Tamura .................. H04N 5/642
                                                   348/E5.13
(Continued)

FOREIGN PATENT DOCUMENTS

CN      201956006 U     8/2011
JP      2002032028 A    1/2002
(Continued)

OTHER PUBLICATIONS

International Search Report based on PCT/JP2017/040402, dated Jan. 9, 2018, 3 pgs.

*Primary Examiner* — Hung S. Bui
(74) *Attorney, Agent, or Firm* — Lerner, David, Littenberg, Krumholz & Mentlik, LLP (57) ABSTRACT

A display apparatus according to the present disclosure includes: a main body including a display panel and a sound generation section; a stand that supports, with respect to an installation surface, the main body from a rear surface side of the main body; and a receiving member that is attached to a lower portion of the main body and supports the main body to allow a gap to be provided between the installation surface and the main body.

5 Claims, 8 Drawing Sheets (51) Int. Cl.
*F16M 11/10* (2006.01)
*F16M 11/22* (2006.01)
*G09F 9/00* (2006.01)
*H04N 5/655* (2006.01)

(56) References Cited

U.S. PATENT DOCUMENTS

| | | | | |
|---|---|---|---|---|
| 8,532,775 | B2* | 9/2013 | Berg | A61B 5/04286 |
| | | | | 607/32 |
| 8,934,067 | B2* | 1/2015 | Jung | H05K 7/14 |
| | | | | 349/58 |
| 9,417,658 | B2* | 8/2016 | Fan | G06F 1/166 |
| 9,602,760 | B2* | 3/2017 | Griffin | H04N 5/64 |
| 2004/0246385 | A1 | 12/2004 | Maruta | |
| 2006/0050471 | A1* | 3/2006 | Chen | G06F 1/1601 |
| | | | | 361/679.22 |
| 2006/0078138 | A1* | 4/2006 | Wada | H04R 1/028 |
| | | | | 381/306 |
| 2012/0176741 | A1* | 7/2012 | Wu | G06F 1/1605 |
| | | | | 361/679.09 |
| 2013/0155587 | A1* | 6/2013 | Take | H05K 5/0204 |
| | | | | 361/679.01 |
| 2013/0258205 | A1* | 10/2013 | Kawasaki | H05K 5/0247 |
| | | | | 348/725 |
| 2014/0247959 | A1* | 9/2014 | Yamanaka | H04R 1/345 |
| | | | | 381/388 |
| 2014/0293140 | A1* | 10/2014 | Tsuzuki | H05K 5/0234 |
| | | | | 348/836 |
| 2015/0230358 | A1 | 8/2015 | Yamamoto et al. | |
| 2015/0341714 | A1* | 11/2015 | Ahn | H04M 1/03 |
| | | | | 381/333 |
| 2015/0350775 | A1* | 12/2015 | Behles | H04R 3/002 |
| | | | | 381/354 |

FOREIGN PATENT DOCUMENTS

| | | |
|---|---|---|
| JP | 3096746 U | 10/2003 |
| JP | 2005184393 A | 7/2005 |
| JP | 2009194541 A | 8/2009 |
| JP | 2012215887 A | 11/2012 |
| JP | 2014095858 A | 5/2014 |
| JP | 2015152719 A | 8/2015 |

\* cited by examiner

CROSS SECTION A-A'

DISPLAY APPARATUS

CROSS-REFERENCE TO RELATED APPLICATIONS

This application is a national phase entry under 35 U.S.C. § 371 of International Application No. PCT/JP2017/040402 filed Nov. 9, 2017, which claims the priority from Japanese Patent Application No. 2016-253587 filed in the Japanese Patent Office on Dec. 27, 2016, the entire contents of which are hereby incorporated by reference.

TECHNICAL FIELD

The present disclosure relates to a display apparatus.

BACKGROUND ART

A display apparatus for television use or the like often includes a speaker in a lower portion of a main body including a display section. In general, in a case of being placed on an installation surface such as a floor surface, such a display apparatus includes a stand attached to the lower portion of the main body.

CITATION LIST

Patent Literature

PTL 1: Japanese Unexamined Patent Application Publication No. 2012-215887

SUMMARY OF THE INVENTION

In general, in a case where a stand is attached to a display apparatus, there is a certain amount of installation space between a main body lower portion and an installation surface. The presence of the installation surface makes it possible to effectively produce sound from a speaker toward a front side.

It is desirable to provide a display apparatus that makes it possible to reduce the installation space in the main body lower portion.

A display apparatus according to an embodiment of the present disclosure includes a main body including a display panel and a sound generation section, a stand that supports, with respect to an installation surface, the main body from a rear surface side, and a receiving member that is attached to a lower portion of the main body and supports the main body to allow a gap to be provided between the installation surface and the main body.

With the display apparatus according to an embodiment of the present disclosure, the main body is supported by the receiving member attached to the lower portion of the main body.

In accordance with the display apparatus according to an embodiment of the present disclosure, because the receiving member is attached to the lower portion of the main body, it is possible to reduce the installation space for the main body lower portion.

It is to be noted that effects of the present disclosure are not necessarily limited, and may be any of the effects described in the present disclosure.

MODES FOR CARRYING OUT THE INVENTION

In the following, embodiments of the present disclosure are described in detail with reference to the drawings. It is to be noted that the description is made in the following order.

1. First Embodiment
   1.1. Overall Configuration of Display Apparatus (FIGS. 1 to 7)
   1.2. Receiving Structure of Main Body (FIGS. 8 to 11)
   1.3. Structure Corresponding to Wireless Communication (FIGS. 12 to 15)
   1.4. Effects
2. Other Embodiments

1. First Embodiment

[1.1 Overall Configuration of Display Apparatus]

Figure 1:
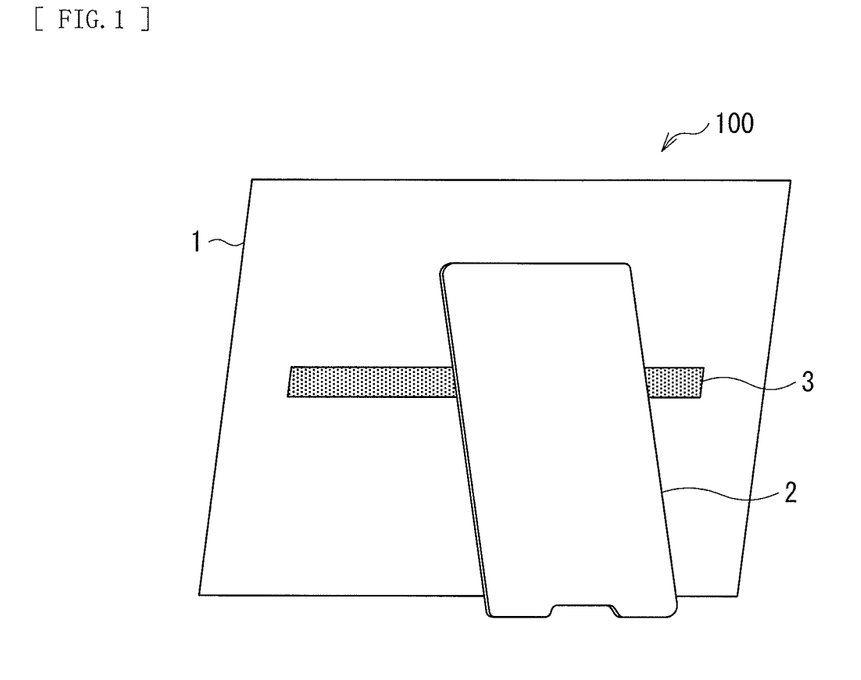
FIG. 1 is an appearance view of a configuration example of a rear surface side of a display apparatus according to a first embodiment of the present disclosure illustrated in a simplified manner.
Figure 2:
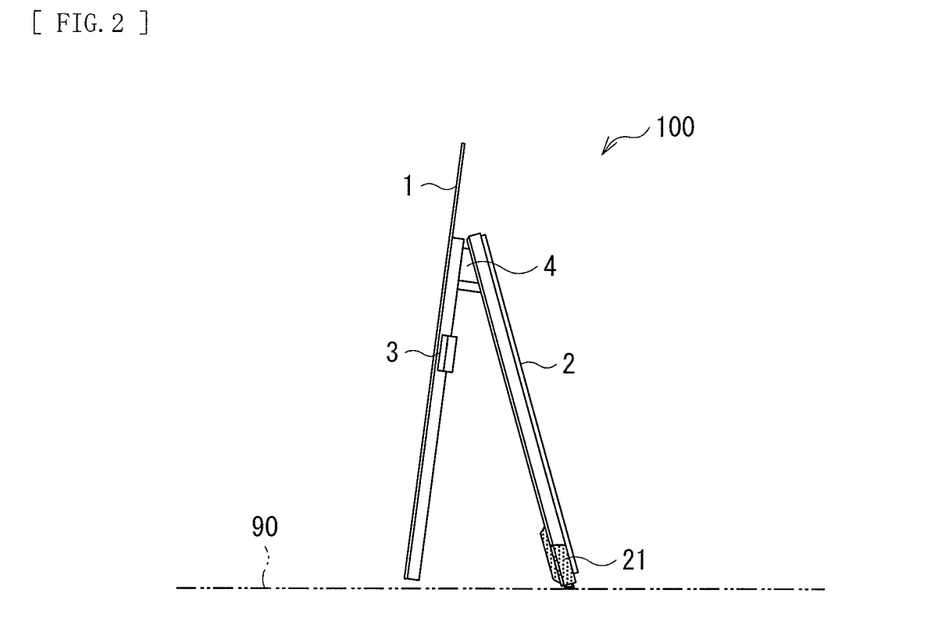
FIG. 2 is a lateral view of a configuration example of a lateral side of the display apparatus according to the first embodiment.
Figure 3:
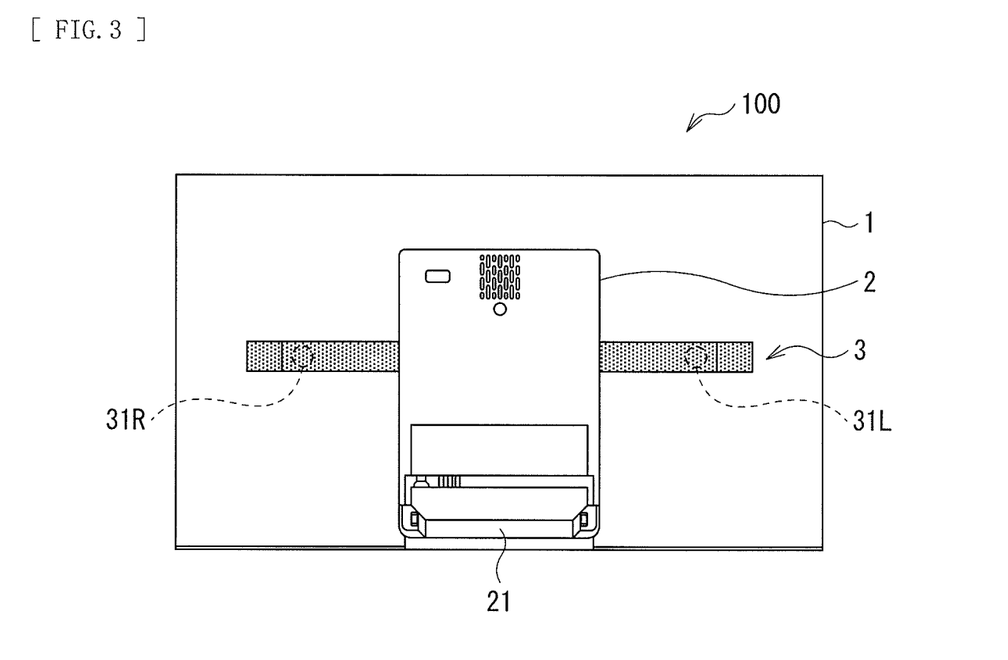
FIG. 3 is a rear view of a configuration example of the rear surface side of the display apparatus according to the first embodiment.

FIG. 1 illustrates a configuration example of a rear surface side of a display apparatus 100 according to a first embodiment of the present disclosure in a simplified manner. FIG. 2 illustrates a configuration example of a lateral side of the display apparatus 100. FIG. 3 illustrates a configuration example of the rear surface side of the display apparatus 100.

The display apparatus according to the present embodiment includes a main body 1 and a stand 2 that supports the main body 1 from the rear surface side with respect to an installation surface 90.

The main body 1 includes a display panel 10 illustrated in FIGS. 10 and 11 to be described later. The display panel 10 is, for example, an organic EL display panel that employs an OLED (Organic Light Emitting Diode).

It is to be noted that, in the present embodiment, a side on which an image is displayed by the display panel 10 is referred to as a front side and an opposite side from the display panel 10 is referred to as a rear surface side.

The main body 1 includes a receiving structure illustrated in FIGS. 8 to 11 to be described later, and is configured to be allowed for direct placement with respect to the installation surface 90 such as a floor surface via a receiving member 60 to be described later.

A reinforcing member 3 having a plate-like shape in a horizontal direction is disposed in the middle of the rear surface of the main body 1. In the interior of the main body 1, as illustrated in FIG. 3, vibration exciters (actuators) 31L and 31R for generating sound are disposed in a partial region corresponding to a position where the reinforcing member 3 is disposed. It is to be noted that the positions to be provided with the vibration exciter 31L and 31R are not limited to the positions illustrated in FIG. 3. It is preferable, however, that the shaker 31R be disposed in the substantially middle of a right half region of the main body 1 as seen from the front side, and the shaker 31L be disposed in the substantially middle of a left half region of the main body 1, in consideration of operating the vibration exciter 31L and 31R as a stereo speaker. A plurality of vibration exciter 31R may be disposed in the substantially middle of the right half region of the main body 1. A plurality of vibration exciter 31L may be disposed in the substantially middle of the left half region of the main body 1.

Figure 4:
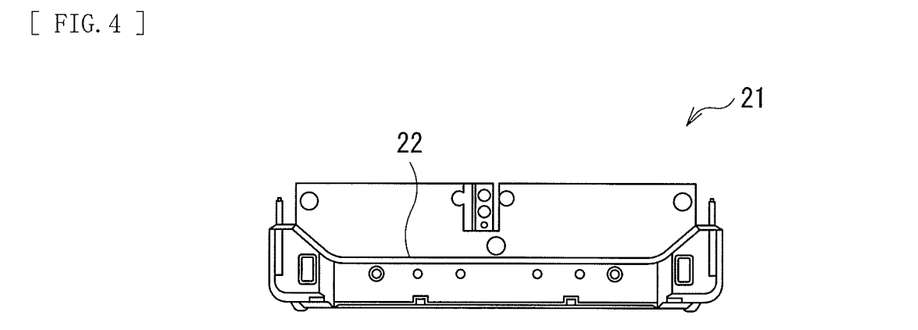
FIG. 4 is a configuration diagram illustrating a configuration example of a support-stabilizing member attached to a lower portion of a stand of the display apparatus according to the first embodiment.

A support-stabilizing member 21 (a weight) adding weight in a downward direction may be attached to the lower portion of the stand 2. This makes it possible to improve stability in a case where the main body 1 is directly placed on the installation surface 90. For example, it is made possible to improve stability of installation without the main body 1 falling down even if the installation surface 90 is a sloping surface inclined toward the rear surface side about 15 degrees. The support-stabilizing member 21 may include an engagement section 22 as illustrated in FIG. 4 and may be attachable to and detachable from the lower portion of the stand 2.

Figure 5:
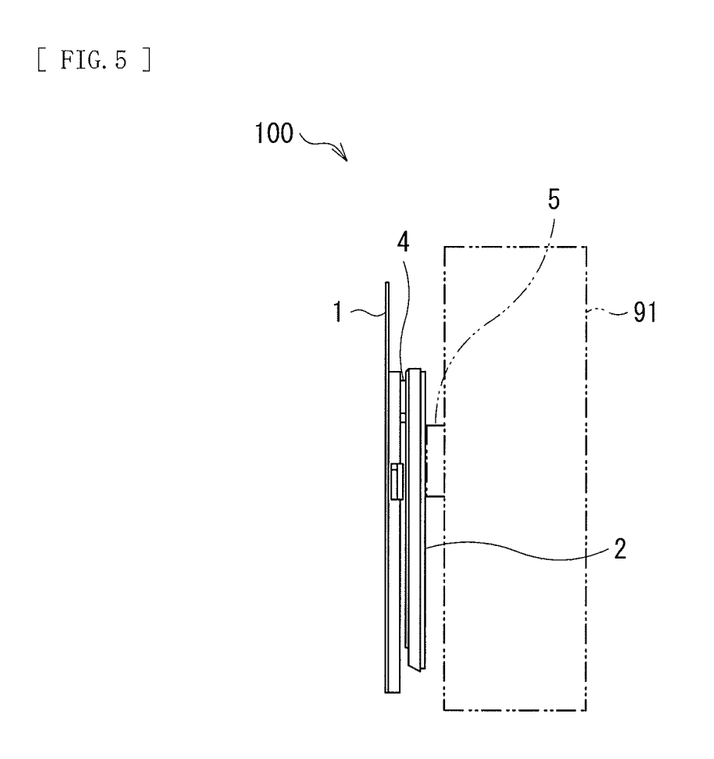
FIG. 5 is a lateral view of a configuration example in a case where the display apparatus according to the first embodiment is attached to a wall.

The stand 2 is attached at its upper portion to the main body 1 with a hinge 4 allowing for opening and closing. As illustrated in FIGS. 1 and 2, to directly place the main body 1 with respect to the installation surface 90, the stand 2 is opened against the main body 1. In contrast, for example, as illustrated in FIG. 5, to attach the display apparatus 100 on a wall 91 or the like, the stand 2 is closed with respect to the main body 1. When attaching to the wall 91 or the like, for example, the stand 2 is attached to a wall surface via a wall attachment member 5. When attaching to the wall 91 or the like, the support-stabilizing member 21 may be removed from the stand 2.

The display apparatus 100 includes a plurality of circuits associated with the display panel 10. The plurality of circuits are preferably divided into the interior of the main body 1 and the interior of the stand 2. For example, a circuit (circuit board) relatively easily generating heat is preferably disposed on the stand 2 side. This makes it possible to reduce thermal influence on the display 10 by the circuit.

Figure 6:
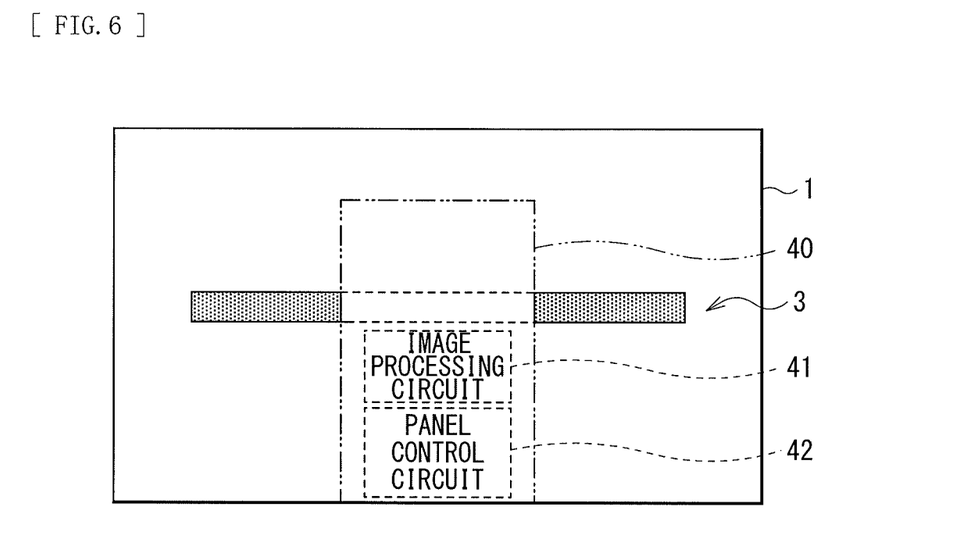
FIG. 6 is a configuration diagram illustrating a configuration example of a circuit section in an interior of the main body of the display apparatus according to the first embodiment.

FIG. 6 illustrates a configuration example of a circuit section 40 in the interior of the main body 1.

The circuit section 40 may include, for example, an image processing circuit 41 and a panel control circuit 42. In addition, the circuit section 40 may include a circuit for driving the vibration exciter 31L and 31R, and the like. It is to be noted that a cover that covers the circuit section 40 may be attached to the rear surface side of the main body 1.

Figure 7:
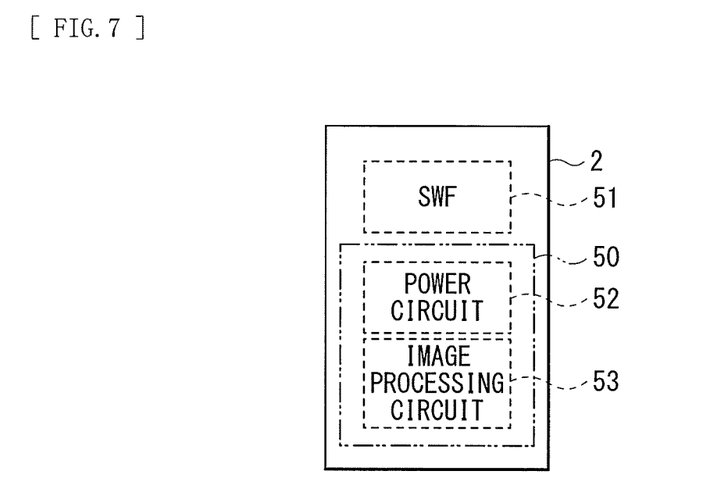
FIG. 7 is a configuration diagram illustrating a configuration example of the circuit section in an interior of the stand of the display apparatus according to the first embodiment.

FIG. 7 illustrates a configuration example of a circuit section 50 in the interior of the stand 2.

The circuit section 50 may include, for example, a power circuit 52 and an image processing circuit 53. The power circuit 52 is a circuit (circuit board) that relatively easily generates heat, and is preferably disposed on the stand 2 side.

Moreover, in the interior of the stand 2, a subwoofer (SWF) 51 may be disposed at the upper portion, for example. They may operate as a speaker in which the vibration exciter 31L and 31R disposed in the interior of the main body 1 assume a mid to high range and the subwoofer assumes a low range.

[1.2. Receiving Structure of Main Body]

Figure 8:
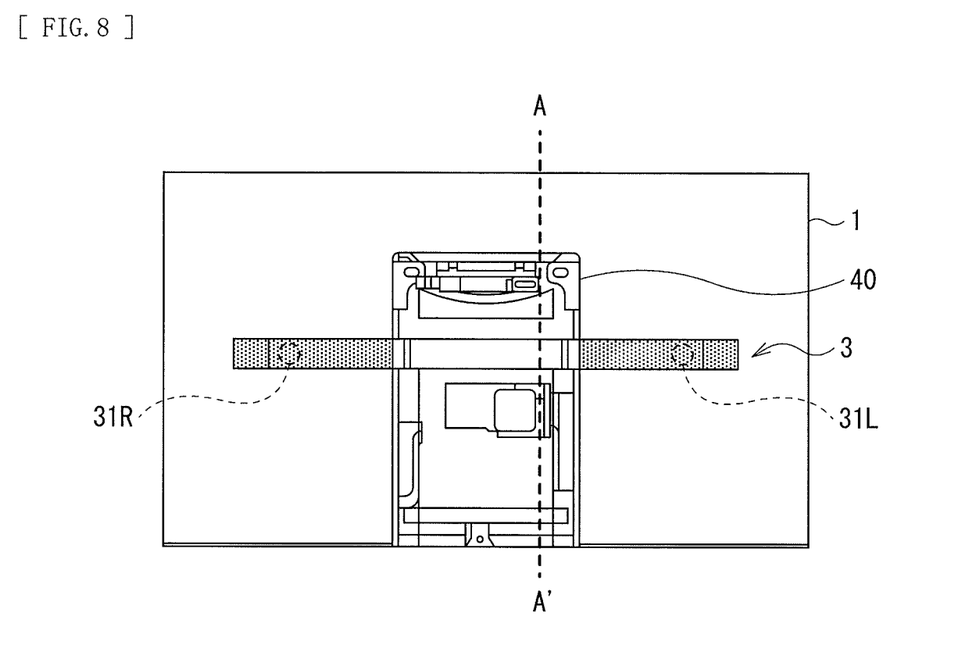
FIG. 8 is a rear view of a configuration example of the rear surface side of the main body of the display apparatus according to the first embodiment.
Figure 9:
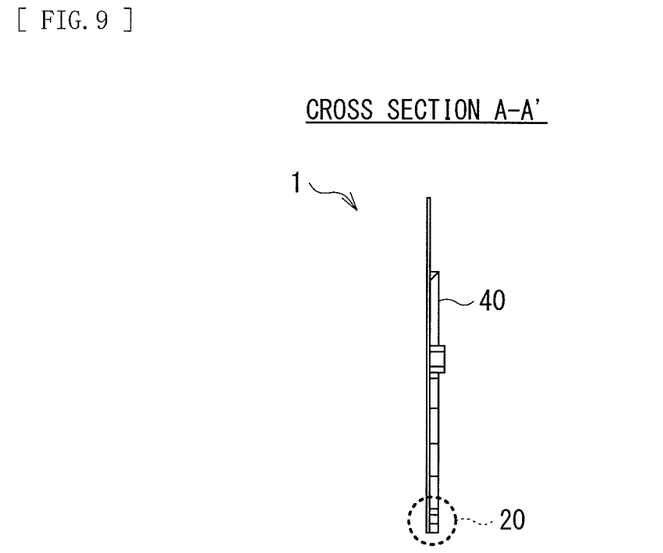
FIG. 9 is a cross-sectional view of a cross-sectional configuration example taken along line A-A' in FIG. 8.

FIG. 8 illustrates a configuration example of the rear surface side of the main body 1. FIG. 9 illustrates a cross-sectional configuration example taken along line A-A' in FIG. 8. FIG. 10 illustrates a cross-sectional configuration example of a middle region lower portion 20 in FIG. 9 in an enlarged manner. FIG. 11 illustrates a cross-sectional configuration example in FIG. 10 in a simplified manner. In FIG. 11, for explanation, only components supposed to be necessary are illustrated in a simplified manner, and illustration of other components are omitted.

It is to be noted that, in FIGS. 8 to 11, the rear surface side of the main body 1 is illustrated without a cover that covers the circuit section 40.

The main body 1 includes the display panel 10, an inner plate 11, a rear surface glass 14, and a back chassis 12 in this order from the front side toward the rear surface side.

Figure 12:
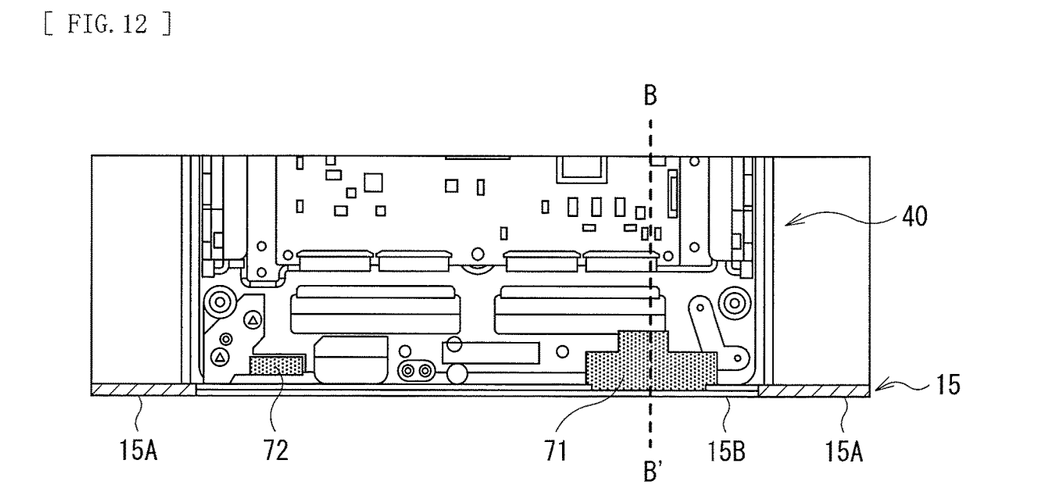
FIG. 12 is a configuration diagram illustrating a configuration example of a lower portion of the circuit section in the main body of the display apparatus according to the first embodiment.
Figure 13:
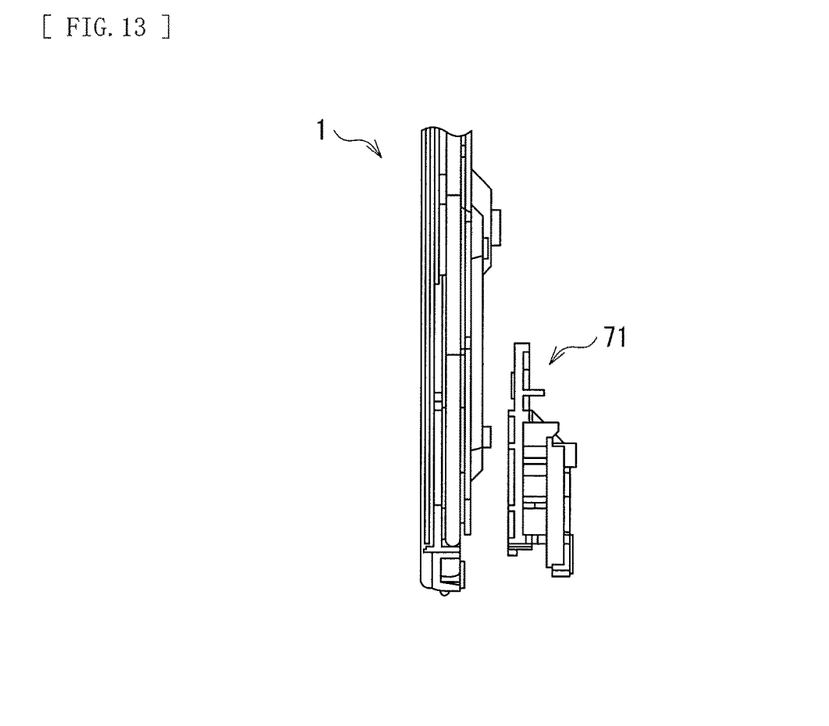
FIG. 13 is a cross-sectional view of a cross-sectional configuration example taken along line B-B' in FIG. 12.
Figure 14:
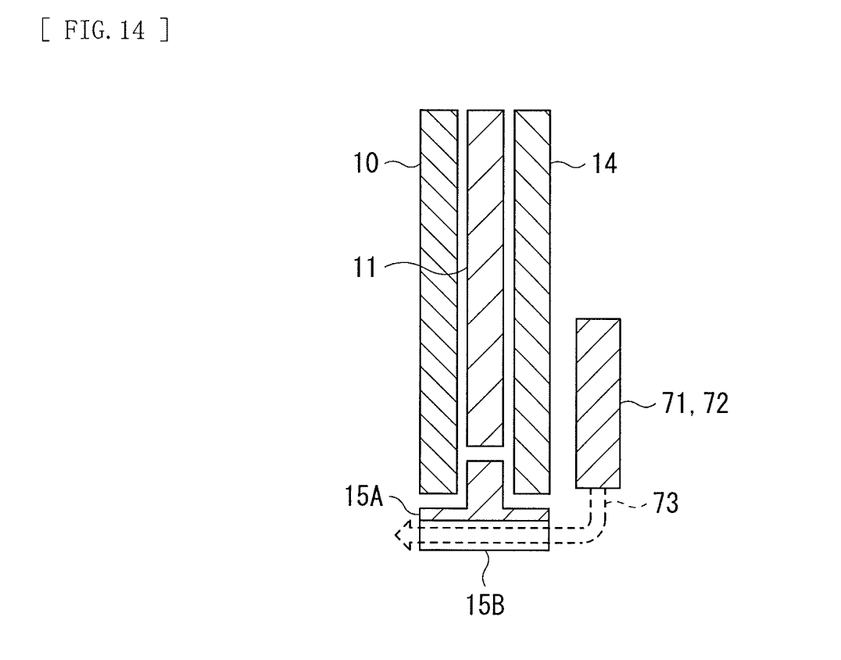
FIG. 14 is a cross-sectional view of the cross-sectional configuration example in FIG. 13 illustrated in a simplified manner.

Moreover, the main body 1 includes a bezel 15 that is an outer frame. The bezel 15 preferably includes a metallic member including aluminum or the like in its major portion, for example, but may partially include a resin member as illustrated in FIGS. 12 to 14 to be described later. The display panel 10, the inner plate 11, and the rear surface glass 14 are sandwiched by the bezel 15 at their peripheral portions.

The inner plate 11 and the back chassis 12 preferably include members having superior heat dissipation and superior heat diffusion. For example, the inner plate 11 and the back chassis 12 preferably include metallic members including aluminum or the like.

The inner plate 11 is disposed with a space 13 from the display panel 10, as illustrated in FIG. 13. The vibration exciter 31L and 31R configure portions of the sound generation section. The vibration exciter 31L and 31R may be actuators that is attached to the inner plate 11 and that generates sound by shaking the display panel 10 via the space 13 between the inner plate 11 and the display panel 10. In this manner, while an existing popular display apparatus produces speaker sound from the installation space in the lower portion of the main body 1 toward the front side, the present embodiment allows the display panel 10 itself to produce the sound toward the front side. That is, the present embodiment has a structure without need of providing the installation space in the lower portion of the main body 1 in order to generate the sound toward the front side.

The receiving member 60 is attached to the middle region lower portion 20 of the main body 1 (FIG. 9). The receiving member 60 supports the main body 1, as illustrated in FIG. 11, allowing a gap 65 to be provided between the installation surface 90 and the main body 1, in other words, allowing portions except for the receiving member 60 to float with respect to the installation surface 90 in the lower portion of the main body 1.

The receiving member 60 preferably includes a material that easily absorbs impact when installing the main body 1 on the installation surface 90. The receiving member 60 is preferably, for example, in the form of a rubber foot.

The receiving member 60 is fixed to the back chassis 12 via an intermediate attachment member 63. The receiving member 60 and the intermediate attachment member 63 are fixed to each other by a screw 61 as a fixing member. The intermediate attachment member 63 and the back chassis 12 are fixed to each other by a screw 62 as the fixing member. The screw 62 is further fixed to a stud 64. The rear surface glass 14, the back chassis 12, and the intermediate attachment member 63 are coupled by the screw 62 and the screw 64.

In this manner, by using the material that easily absorbs impact as the receiving member 60 and fixing the receiving member 60 to the back chassis 12 via the screws 61, 62 and the intermediate attachment member 63, the structure is achieved in which the impact when installing the main body 1 on the installation surface 90 is hardly transferred to the display panel 10.

Figure 10:
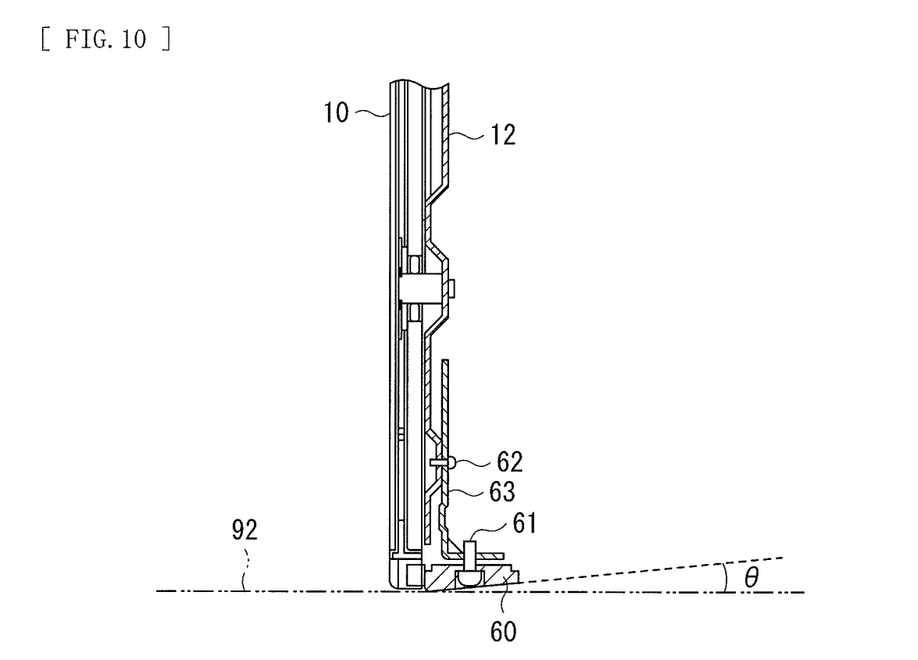
FIG. 10 is a cross-sectional view of a cross-sectional configuration example of a lower portion of a middle region in FIG. 9 illustrated in an enlarged manner.
Figure 11:
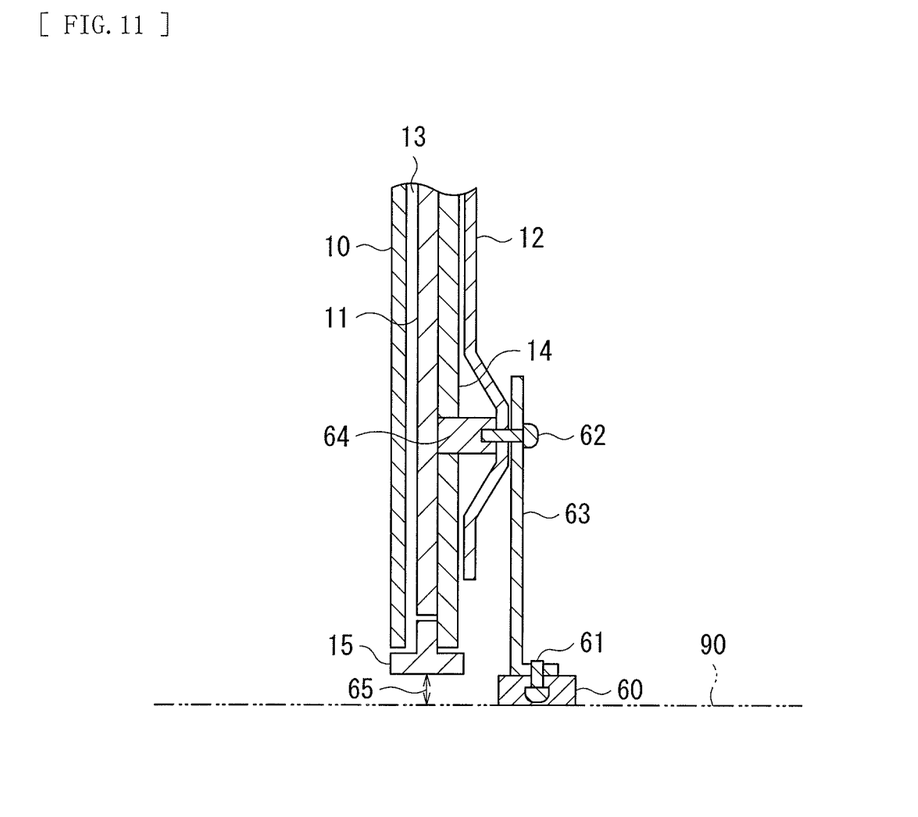
FIG. 11 is a cross-sectional view of the cross-sectional configuration example in FIG. 10 illustrated in a simplified manner.

A bottom surface of the receiving member 60 may have a shape inclined with respect to a horizontal plane 92 by a predetermined angle of inclination θ, as illustrated in FIG. 10, for example. This makes it possible to improve stability in a case where the main body 1 is disposed to be inclined with respect to the horizontal plane 92.

[1.3. Structure Corresponding to Wireless Communication]

Figure 15:
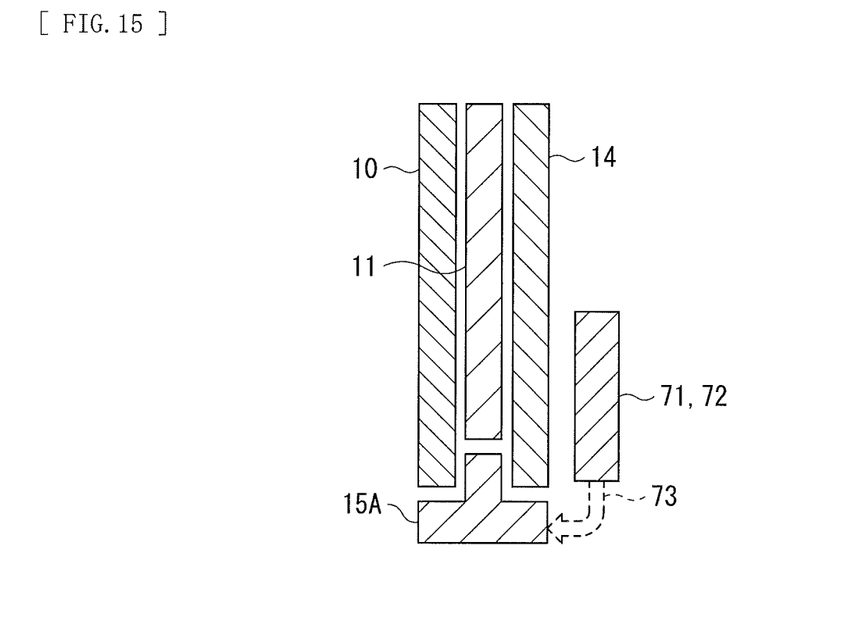
FIG. 15 is a cross-sectional view of a cross-sectional configuration example of a comparison example corresponding to the cross-sectional configuration example in FIG. 14.

FIG. 12 illustrates a configuration example of the lower portion of the circuit section 40 in the main body 1. FIG. 13 illustrates a cross-sectional configuration example taken along line B-B' in FIG. 12. FIG. 14 illustrates the cross-sectional configuration example in FIG. 13 in a simplified manner. FIG. 15 illustrates a cross-sectional configuration example of a comparison example corresponding to the cross-sectional configuration example in FIG. 14. In FIGS. 14 and 15, for explanation, only components supposed to be necessary are illustrated in a simplified manner, and illustration of other components are omitted.

It is to be noted that, in FIGS. 12 to 15, the rear surface side of the main body 1 is illustrated without the cover that covers the circuit section 40.

The circuit section 40 in the main body 1 may be provided with communication circuit sections 71 and 72 that perform wireless communication. The communication circuit section 71 may be a circuit section for Wi-Fi (registered trademark), for example. The communication circuit section 72 may be a circuit section for Bluetooth (Bluetooth) (registered trademark), for example. The communication circuit sections 71 and 72 have an antenna section for transmitting and receiving a wireless signal 73.

The communication circuit sections 71 and 72 may be disposed, as illustrated in FIGS. 12 to 14, near the bezel 15 that is the outer frame on the rear surface side of the main body 1, and in this case, it is preferable that the bezel 15 include a member partially allowing the wireless signal 73 to pass therethrough. For example, the middle region of the lower portion of the bezel 15 may include a resin member 15B allowing the wireless signal 73 to pass therethrough and another major portion of the bezel 15 may include an aluminum member 15A.

Furthermore, the communication circuit sections 71 and 72 may be disposed allowing the antenna section of the communication circuit sections 71 and 72 to be in a position corresponding to the resin member 15B. This allows for wireless communication with the front side of the main body 1 by the wireless signal 73 passing through the resin member 15B, as illustrated in FIG. 14.

In a case where the bezel 15 does not include a region configured by the resin member 15B, as illustrated in FIG. 15, because the wireless signal 73 is blocked by the aluminum member 15A, wireless communication with the front side of the main body 1 is difficult. With the existing popular display apparatus, providing the installation space in the lower portion of the main body 1 may make wireless communication possible without providing the region configured by the resin member 15B. In contrast, in the present embodiment, providing the region configured by the resin member 15B makes wireless communication possible with the front side of the main body 1 without providing the installation space in the lower portion of the main body 1.

[1.4. Effects]

As described above, according to the present embodiment, because the receiving member 60 is attached to the lower portion of the main body 1, it is possible to reduce the installation space in the main body lower portion.

It is to be noted that the effects described in this specification are merely examples and not limited thereto, but there may be other effects.

2. Other Embodiments

The technology according to the present disclosure is not limited to the description of the above-described embodiments but various modifications may be made thereto.

For example, the present disclosure may have the following configurations.

(1)

A display apparatus, including:

a main body including a display panel and a sound generation section;

a stand that supports, with respect to an installation surface, the main body from a rear surface side of the main body; and a receiving member that is attached to a lower portion of the main body and supports the main body to allow a gap to be provided between the installation surface and the main body.

(2)

The display apparatus according to (1), in which the main body further includes a back chassis disposed on the rear surface side with respect to the display panel, and the receiving member is fixed to the back chassis via an intermediate attachment member.

(3)

The display apparatus according to (1) or (2), in which the receiving member is attached to a middle region of the main body.

(4)

The display apparatus according to any one of (1) to (3), further including:

a plurality of circuits associated with the display panel, in which the plurality of circuits is disposed both in an interior of the main body and in an interior of the stand.

(5)

The display apparatus according to any one of (1) to (4), further including:

a support-stabilizing member that is attached to the lower portion of the stand and adds weight in a downward direction of the stand.

(6)

The display apparatus according to any one of (1) to (5), in which the main body further includes an outer frame including a member that partially allows a wireless signal to pass therethrough, and the main body further includes a communication circuit section that is disposed near the outer frame on the rear surface side of the main body and performs wireless communication.

(7)

The display apparatus according to (2), in which the main body further includes an inner plate that is disposed between the display panel and the back chassis and is disposed with a space from the display panel, and the sound generation section includes a shaker that is attached to the inner plate and generates sound by shaking the display panel via a space between the inner plate and the display panel.

This application claims the priority of Japanese Priority Patent Application JP2016-253587 filed with the Japanese Patent Office on Dec. 27, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display apparatus, comprising:

a main body including a display panel, a sound generation section, and a back chassis disposed on a rear surface side of the main body;

a stand that supports, with respect to an installation surface, the main body from the rear surface side of the main body; and a receiving member that is attached to a lower portion of the main body via an intermediate attachment member and not attached to the stand, and supports the main body to allow a gap to be provided between the installation surface and the main body; and wherein the main body further includes an inner plate that is disposed between the display panel and the back chassis and is disposed with a space from the display, and the sound generation section includes a shaker that is attached to the inner generates sound by shaking the display panel via a space between the inner plate and the display panel.

2. The display apparatus according to claim 1, wherein the receiving member is attached to a middle region lower portion of the main body.

3. The display apparatus according to claim 1, further comprising:

a plurality of circuits associated with the display panel, wherein the plurality of circuits is disposed both in an interior of the main body and in an interior of the stand.

4. The display apparatus according to claim 1, further comprising:

a support-stabilizing member that is attached to the lower portion of the stand and adds weight in a downward direction of the stand.

5. The display apparatus according to claim 1, wherein the main body further includes an outer frame including a member that partially allows a wireless signal to pass therethrough, and the main body further includes a communication circuit section that is disposed near the outer frame on the rear surface side of the main body and performs wireless communication.

* * * * *